(12) United States Patent
Sun et al.

(10) Patent No.: US 9,648,641 B2
(45) Date of Patent: May 9, 2017

(54) DATA TRANSMISSION METHOD, BASE STATION, AND TERMINAL

(71) Applicant: Samsung Electronics Co., Ltd., Suwon-si, Gyeonggi-do (KR)

(72) Inventors: Pengfei Sun, Beijing (CN); Bin Yu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 95 days.

(21) Appl. No.: 14/679,465

(22) Filed: Apr. 6, 2015

(65) Prior Publication Data

US 2015/0289292 A1 Oct. 8, 2015

(30) Foreign Application Priority Data

Apr. 4, 2014 (CN) .......................... 2014 1 0136768
Jul. 28, 2014 (CN) .......................... 2014 1 0363507

(51) Int. Cl.
*H04W 74/08* (2009.01)
*H04B 7/04* (2006.01)
(Continued)

(52) U.S. Cl.
CPC ........... *H04W 74/0833* (2013.01); *H04L 1/00* (2013.01); *H04L 1/1607* (2013.01); *H04L 5/0053* (2013.01); *H04L 5/0092* (2013.01); *H04L 27/2613* (2013.01); *H04L 27/2646* (2013.01); *H04W 74/008* (2013.01);
(Continued)

(58) Field of Classification Search
CPC ........... H04W 74/0833; H04W 74/008; H04W 28/06; H04L 1/1607; H04L 27/2646; H04L 1/00; H04L 27/2613; H04L 5/0053; H04L 5/0092; H04L 27/264; H04L 5/0007; H04L 5/0023; H04L 5/0028
See application file for complete search history.

(56) References Cited

U.S. PATENT DOCUMENTS

2013/0235858 A1* 9/2013 Zhao ..................... H04W 56/00
370/336
2014/0112286 A1* 4/2014 Ahn .................... H04W 74/002
370/329
(Continued)

*Primary Examiner* — Brian D Nguyen
(74) *Attorney, Agent, or Firm* — Jefferson IP Law, LLP

(57) ABSTRACT

A data transmission method is provided. The method includes obtaining configuration information, wherein the configuration information indicates transmission resources of a random access preamble and payload data corresponding to the random access preamble, transmitting the random access preamble and the payload data at the transmission resources, modulating the payload data using a modulation scheme supporting asynchronous transmission, and receiving feedback information, wherein the feedback information comprises an indication which indicates whether the payload data is successfully received. Various examples of the present disclosure also describe a method for receiving data with space multiplexing which is applied to a base station side, and further describe a terminal and a base station. Employing the examples of the present disclosure, transmission efficiency of long duty cycle and sporadic small data packets of a large number of devices in the Internet of Things in future communication systems can be improved.

32 Claims, 13 Drawing Sheets

(51) Int. Cl.
 *H04B 7/01* (2006.01)
 *H04L 27/26* (2006.01)
 *H04L 1/16* (2006.01)
 *H04W 74/00* (2009.01)
 *H04L 1/00* (2006.01)
 *H04W 28/06* (2009.01)
 *H04L 5/00* (2006.01)
(52) U.S. Cl.
 CPC .......... *H04L 5/0007* (2013.01); *H04L 5/0023* (2013.01); *H04L 5/0028* (2013.01); *H04L 27/264* (2013.01); *H04W 28/06* (2013.01)

(56) References Cited

U.S. PATENT DOCUMENTS

| | | | |
|---|---|---|---|
| 2014/0161086 A1* | 6/2014 | Tamura | H04W 72/14 370/329 |
| 2014/0185483 A1* | 7/2014 | Kim | H04W 24/02 370/252 |
| 2014/0185595 A1* | 7/2014 | Wu | H04W 56/00 370/336 |
| 2014/0198746 A1* | 7/2014 | Ahn | H04L 5/001 370/329 |
| 2014/0204771 A1* | 7/2014 | Gao | H04W 36/28 370/252 |

* cited by examiner

DATA TRANSMISSION METHOD, BASE STATION, AND TERMINAL

CROSS-REFERENCE TO RELATED APPLICATION(S)

This application claims the benefit under 35 U.S.C. §119(a) of a Chinese patent application filed on Apr. 4, 2014 in the Chinese Intellectual Property Office and assigned Serial No. 201410136768.1, and of a Chinese patent application filed on Jul. 28, 2014 in the Chinese Intellectual Property Office and assigned Serial No. 201410363507.3, the entire disclosure of each of which is hereby incorporated by reference

TECHNICAL FIELD

The present disclosure relates to wireless communication technology. More particularly, the present disclosure relates to a data transmission method, a base station, and a terminal.

BACKGROUND

With the development of wireless communication technology, more and more application techniques have been developed. These application techniques employ wireless communication facilities to provide new interactive information modes for users and work in a variety of scenarios. However, the rapid emergence of these application techniques also leads to unprecedented challenges to the wireless communication technology. Among the numerous challenges, the rapidly-developing service of the Internet of Things is becoming a hot spot of wireless communication research. In order to provide a network through which a person can be seamlessly connected with nature and machines, and even through which machines can be connected seamlessly to other machines, the wireless communication technology may adopt new solutions to deal with potential demands.

The Internet of Things refers to access devices that may be extended from people to objective things. It is expected that the number of such access devices will greatly increase in the future. By 2020, the number of devices wirelessly connected may be 100 times the current number. On the other hand, most applications of the Internet of Things, such as devices for remote meter reading, environmental monitoring, and industrial control, are all restricted to limited application scenarios. As such, these devices generate a small amount of data and have a longer duty cycle. Thus, from the perspective of the communication network, a concern regarding the Internet of Things is how to efficiently support a long duty cycle of a large number of devices and small data packets sporadically sent from the devices.

To meet the demand for wireless data traffic, which has increased since the deployment of $4^{th}$-Generation (4G) communication systems, efforts have been made to develop an improved $5^{th}$-Generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), Full Dimensional MIMO (FD-MIMO), antenna arrays, analog beam forming, and large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (QAM) Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In an LTE system corresponding to the Evolved Universal Terrestrial Radio Access (E-UTRA) protocol developed by the 3rd Generation Partnership Project (3GPP), uplink transmission of a mobile terminal uses a Single Carrier Frequency Division Multiple Access (SC-FDMA) modulation scheme. In order to avoid multi-user interference, uplink transmission of multiple users is performed using a synchronous transmission scheme. That is, the time of uplink signals of the multiple users reaching a base station is strictly aligned. To achieve this uplink synchronization transmission, the LTE system adopts an uplink timing advance scheme. The base station uses downlink control signaling to inform the mobile terminal of an advance value between the time of transmitting an uplink signal and the time of receiving a downlink signal. Before the base station obtains an initial timing advance value of the mobile terminal, the base station may generally consider that the mobile terminal is in an asynchronous state. The mobile terminal in the asynchronous state is not allowed to transmit uplink data so as to avoid potential interferences. The process of obtaining, by the base station, the initial timing advance value of the mobile terminal is called an uplink synchronization process.

The uplink synchronization of LTE uses a random access procedure, in which, under a contention scheme, a terminal transmits a randomly-selected physical random access channel (PRACH) preamble (which may also be referred to as a Signature). A base station detects the preamble signal, estimates the uplink reception time, and calculates a timing advance value based on the estimated uplink reception time.

FIG. 1 is a schematic diagram illustrating an LTE random access procedure according to the related art.

Referring to FIG. 1, after the random access preamble is transmitted, the random access procedure may complete subsequent steps to complete the whole random access procedure.

At operation 105, the terminal transmits the random access preamble to the base station.

At operation 110, the base station returns a random access response to the terminal.

At operation 115, the terminal transmits the message to the base station.

At operation 120, the base station transmits a contention resolution message to the terminal.

FIG. 2 is a schematic diagram illustrating a structure of an LTE PRACH preamble according to the related art.

Referring to FIG. 2, the preamble is composed of two parts including a cyclic prefix (CP) and a Sequence. The lengths of the CP and/or the Sequence of different preamble formats are different.

The preamble formats currently supported by both the time division duplexing (TDD) mode and the frequency division duplexing (FDD) mode in the LTE system are shown in Table 1.

TABLE 1

| Preamble formats | | |
|---|---|---|
| Preamble format | $T_{CP}$ | $T_{SEQ}$ |
| 0 | $3168 \cdot T_s$ | $24576 \cdot T_s$ |
| 1 | $21024 \cdot T_s$ | $24576 \cdot T_s$ |
| 2 | $6240 \cdot T_s$ | $2 \cdot 24576 \cdot T_s$ |
| 3 | $21024 \cdot T_s$ | $2 \cdot 24576 \cdot T_s$ |
| 4 | $448 \cdot T_s$ | $4096 \cdot T_s$ |
| (only applied to the TDD mode) | | |

In the frequency domain, each PRACH described above occupies six physical resource blocks (PRB). Each PRB includes twelve subcarriers, and the bandwidth of each subcarrier is 15 kHz. Random access configurations of the LTE FDD system and the LTE TDD system are respectively shown in Table 2 and Table 3.

TABLE 2

| Random access configuration of LTE FDD system | | | |
|---|---|---|---|
| PRACH Configuration Index | Preamble Format | System frame number | Subframe number |
| 0 | 0 | Even | 1 |
| 1 | 0 | Even | 4 |
| 2 | 0 | Even | 7 |
| 3 | 0 | Any | 1 |
| 4 | 0 | Any | 4 |
| 5 | 0 | Any | 7 |
| 6 | 0 | Any | 1, 6 |
| 7 | 0 | Any | 2, 7 |
| 8 | 0 | Any | 3, 8 |
| 9 | 0 | Any | 1, 4, 7 |
| 10 | 0 | Any | 2, 5, 8 |
| 11 | 0 | Any | 3, 6, 9 |
| 12 | 0 | Any | 0, 2, 4, 6, 8 |
| 13 | 0 | Any | 1, 3, 5, 7, 9 |
| 14 | 0 | Any | 0, 1, 2, 3, 4, 5, 6, 7, 8, 9 |
| 15 | 0 | Even | 9 |
| 16 | 1 | Even | 1 |
| 17 | 1 | Even | 4 |
| 18 | 1 | Even | 7 |
| 19 | 1 | Any | 1 |
| 20 | 1 | Any | 4 |
| 21 | 1 | Any | 7 |
| 22 | 1 | Any | 1, 6 |
| 23 | 1 | Any | 2, 7 |
| 24 | 1 | Any | 3, 8 |
| 25 | 1 | Any | 1, 4, 7 |
| 26 | 1 | Any | 2, 5, 8 |
| 27 | 1 | Any | 3, 6, 9 |
| 28 | 1 | Any | 0, 2, 4, 6, 8 |
| 29 | 1 | Any | 1, 3, 5, 7, 9 |
| 30 | N/A | N/A | N/A |
| 31 | 1 | Even | 9 |
| 32 | 2 | Even | 1 |
| 33 | 2 | Even | 4 |
| 34 | 2 | Even | 7 |
| 35 | 2 | Any | 1 |
| 36 | 2 | Any | 4 |
| 37 | 2 | Any | 7 |
| 38 | 2 | Any | 1, 6 |
| 39 | 2 | Any | 2, 7 |
| 40 | 2 | Any | 3, 8 |
| 41 | 2 | Any | 1, 4, 7 |
| 42 | 2 | Any | 2, 5, 8 |
| 43 | 2 | Any | 3, 6, 9 |
| 44 | 2 | Any | 0, 2, 4, 6, 8 |
| 45 | 2 | Any | 1, 3, 5, 7, 9 |
| 46 | N/A | N/A | N/A |
| 47 | 2 | Even | 9 |
| 48 | 3 | Even | 1 |
| 49 | 3 | Even | 4 |
| 50 | 3 | Even | 7 |
| 51 | 3 | Any | 1 |
| 52 | 3 | Any | 4 |
| 53 | 3 | Any | 7 |
| 54 | 3 | Any | 1, 6 |
| 55 | 3 | Any | 2, 7 |
| 56 | 3 | Any | 3, 8 |
| 57 | 3 | Any | 1, 4, 7 |
| 58 | 3 | Any | 2, 5, 8 |
| 59 | 3 | Any | 3, 6, 9 |
| 60 | N/A | N/A | N/A |
| 61 | N/A | N/A | N/A |
| 62 | N/A | N/A | N/A |
| 63 | 3 | Even | 9 |

TABLE 3

Random access configuration of the LTE TDD system

| PRACH Configuration Index | Preamble Format | Density Per 10 ms ($D_{RA}$) | Version ($r_{RA}$) |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |
| 20 | 1 | 0.5 | 0 |
| 21 | 1 | 0.5 | 1 |
| 22 | 1 | 0.5 | 2 |
| 23 | 1 | 1 | 0 |
| 24 | 1 | 1 | 1 |
| 25 | 1 | 2 | 0 |
| 26 | 1 | 3 | 0 |
| 27 | 1 | 4 | 0 |
| 28 | 1 | 5 | 0 |
| 29 | 1 | 6 | 0 |
| 30 | 2 | 0.5 | 0 |
| 31 | 2 | 0.5 | 1 |
| 32 | 2 | 0.5 | 2 |
| 33 | 2 | 1 | 0 |
| 34 | 2 | 1 | 1 |
| 35 | 2 | 2 | 0 |
| 36 | 2 | 3 | 0 |
| 37 | 2 | 4 | 0 |
| 38 | 2 | 5 | 0 |
| 39 | 2 | 6 | 0 |
| 40 | 3 | 0.5 | 0 |
| 41 | 3 | 0.5 | 1 |
| 42 | 3 | 0.5 | 2 |
| 43 | 3 | 1 | 0 |
| 44 | 3 | 1 | 1 |
| 45 | 3 | 2 | 0 |
| 46 | 3 | 3 | 0 |
| 47 | 3 | 4 | 0 |
| 48 | 4 | 0.5 | 0 |
| 49 | 4 | 0.5 | 1 |
| 50 | 4 | 0.5 | 2 |
| 51 | 4 | 1 | 0 |
| 52 | 4 | 1 | 1 |
| 53 | 4 | 2 | 0 |
| 54 | 4 | 3 | 0 |
| 55 | 4 | 4 | 0 |
| 56 | 4 | 5 | 0 |
| 57 | 4 | 6 | 0 |

Referring again to FIG. 1, the random access response in operation 110 includes timing advance information. The terminal transmits the message in operation 115 based on the timing advance information. According to LTE standards, a mobile terminal may enter the asynchronous state when the mobile terminal enters an IDLE state or the mobile terminal does not receive timing advance signaling over a long period of time. When the terminal in the asynchronous state finds that there is uplink data needed to be transmitted, the terminal may complete the entire random access procedure to enter an uplink synchronization state. As mentioned earlier, a feature of a terminal in the Internet of Things is a small data amount, a long duty cycle with sporadic transmission, and a large number of access devices. The long duty cycle means that when the terminal completes data transmission, the terminal may enter a sleep state to reduce energy consumption. This means that the terminal loses the uplink synchronization and must perform the random access procedure again during the next data transmission. Under the circumstance of a small data amount and a large number of access devices, such frequent random access procedure becomes very inefficient. Such inefficiency is reflected in that a great deal of overhead is used to perform the random access procedure, while the data transmission supported by the overhead is extremely small.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a terminal, a base station, and a method for transmitting a small data amount so as to improve transmission efficiency of long duty cycles and sporadic small data packets of a large number of devices in the Internet of Things in future communication systems.

In accordance with an aspect of the present disclosure, a data transmission method is provided. The method includes obtaining configuration information, wherein the configuration information indicates transmission resources of a random access preamble and payload data corresponding to the random access preamble, transmitting the random access preamble and the payload data at the transmission resources, modulating the payload data using a modulation scheme supporting asynchronous transmission, and receiving feedback information, wherein the feedback information comprises an indication which indicates whether the payload data is successfully received.

In accordance with another aspect of the present disclosure, the transmission resources comprise a position of resources transmitting the random access preamble and a mapping relationship between the random access preamble and the payload data resources, and the mapping relationship indicates at least one of a position and size of the payload data resources corresponding to the random access preamble, a modulation and coding scheme (MCS) of the payload data corresponding to the random access preamble, a filter parameter or a filter bank parameter of the payload data corresponding to the random access preamble, and a demodulation reference signal of the payload data corresponding to the random access preamble.

In accordance with another aspect of the present disclosure, the mapping relationship further comprises two or more random access preambles that correspond to the same payload data resources, wherein demodulation reference signals of payload data corresponding to the random access preambles are orthogonal or quasi-orthogonal to each other.

In accordance with another aspect of the present disclosure, the demodulation reference signal is the corresponding random access preamble, so that the two or more random access preambles are orthogonal or quasi-orthogonal to each other.

In accordance with another aspect of the present disclosure, the demodulation reference signal is an orthogonal or quasi-orthogonal reference signal corresponding to the random access preamble and indicated by the mapping relationship, wherein the operation of transmitting the random access preamble and the payload data at the transmission resources comprises transmitting the orthogonal or quasi-orthogonal reference signal corresponding to the random access preamble and indicated by the mapping relationship at the corresponding payload data resources.

In accordance with another aspect of the present disclosure, a time of transmitting the payload data is calculated based on a time of transmitting the preamble, wherein, when the time of transmitting the preamble is N, the time of transmitting the payload data is N+k, wherein k≥0.

In accordance with another aspect of the present disclosure, the method further includes transmitting the payload data using a cyclic redundancy check scrambling code, wherein the cyclic redundancy check scrambling code is calculated based on an index of resources occupied by the random access preamble and the index of the random access preamble.

In accordance with another aspect of the present disclosure, the method further includes obtaining a grouping and mapping relationship between the random access preamble and the payload data resources, wherein the grouping and mapping relationship comprises respectively grouping the random access preamble and the payload data resources into a normal set and one or more particular set, wherein the particular set of each random access preamble corresponds to a particular scenario or event and corresponds to a particular set of the payload data resources applied to the particular scenario or event.

In accordance with another aspect of the present disclosure, the particular scenario or event comprises at least one of a high-speed scenario, an event triggered by a too large pathloss, a scenario of large channel delay, an event triggered by too many data transmission failures, and a large data block event.

In accordance with another aspect of the present disclosure, the method further includes transmitting the payload data at payload data resources in the particular set of the payload data resources using a specific modulation scheme and/or a filter parameter comprising using a higher overlapping factor to implement single-carrier modulation or multi-carrier modulation based on the filter or the filter bank, using a prototype filter coefficient which is more suitable for high Doppler frequency shift, using multi-carrier modulation based on the filter or the filter bank in which adjacent sub-carriers do not overlap with each other, using a low-order modulation and coding scheme, and using low-order multi-user space multiplexing.

In accordance with another aspect of the present disclosure, before the transmitting of the random access preamble and the payload data at the transmission resources, the method further includes selecting, through a predefined rule, a random access preamble in a corresponding random access preamble set according to the obtained grouping and mapping relationship between the random access preamble and the payload data resources, wherein the transmitting of the random access preamble and the payload data at the transmission resources comprises after the transmitting of the random access preamble at the position of the resources transmitting the random access preamble, transmitting the payload data at the corresponding payload resources based on the grouping and mapping relationship and using a modulation and coding scheme and filter parameters determined by the grouping and mapping relationship.

In accordance with another aspect of the present disclosure, the predefined rule comprises at least one of a preset pathloss threshold, a threshold of the number of data transmission failures, a threshold of Doppler frequency shift or moving speed, a threshold of data block size and a power threshold.

In accordance with another aspect of the present disclosure, the payload data comprises valid data and a user identifier.

In accordance with another aspect of the present disclosure, the payload data further comprises buffer state information.

In accordance with another aspect of the present disclosure, the operation of receiving the feedback information includes receiving the feedback information from a control channel or a data channel, wherein the feedback information comprises one or more user identifier and is configured to indicate whether payload data of the one or more user is successfully received.

In accordance with another aspect of the present disclosure, the method further includes, based on the detected feedback information, re-transmitting the random access preamble and the payload data.

In accordance with another aspect of the present disclosure, the feedback information carries control information, wherein the control information comprises a user identifier assigned by a network, uplink transmission resources, timing advance information, and backoff indication information, the method further comprising performing a backoff transmission mode based on the detected feedback information, wherein the backoff transmission mode adopts a modulation scheme that is not based on a filter or a filter bank, and the backoff transmission mode transmits the payload data using uplink transmission resources indicated by the feedback information.

In accordance with another aspect of the present disclosure, a the method further includes calculating an uplink transmission time in the backoff transmission mode based on the timing advance information, and transmitting the payload data or random access procedure related data through the backoff transmission mode.

In accordance with another aspect of the present disclosure, the method further includes when the feedback information is detected and the feedback information does not comprise the identifier of the terminal, randomly re-selecting a random access preamble according to a predefined rule, determining transmission resources of corresponding payload data according to the re-selected random access preamble, transmitting the re-selected random access preamble, and transmitting the payload data at the transmission resources of the payload data, wherein the transmission power is increased or remains unchanged.

In accordance with another aspect of the present disclosure, the method further includes detecting the feedback information using a cyclic redundancy check, wherein a cyclic redundancy check scrambling code is calculated based on resources occupied by the random access preamble or based on the resources occupied by the random access preamble and the index of the random access preamble.

In accordance with another aspect of the present disclosure, the operation of receiving the feedback information includes detecting the feedback information within a fixed time window, wherein starting time of the time window is calculated based on time of transmitting the payload data or time of transmitting the random access preamble, and when the feedback information is not successfully detected within the time window, determining that the random access preamble and the payload data are not successfully received, and re-transmitting the random access preamble and the payload data.

In accordance with another aspect of the present disclosure, the re-transmitting of the random access preamble and the payload data includes randomly re-selecting a random access preamble according to a predefined rule, determining transmission resources of corresponding payload data according to the re-selected random access preamble, transmitting the re-selected random access preamble, and transmitting the payload data at the transmission resources of the payload data, wherein the transmission power is increased or remains unchanged.

In accordance with another aspect of the present disclosure, the modulation scheme supporting the asynchronous transmission includes a single-carrier or multi-carrier modulation scheme based on a filter and a multi-carrier modulation scheme based on a filter bank comprising any one or any combination of Filter bank multiple carrier (FBMC), Orthogonal frequency division multiplexing-Offset quadrature amplitude modulation (OFDM-OQAM), Filtered orthogonal frequency domain multiplexing (Filter-OFDM), Generalized frequency domain multiplexing (GFDM), and SC-FBMC, wherein the modulation scheme supporting the asynchronous transmission does not require strict uplink synchronization.

In accordance with another aspect of the present disclosure, the modulation scheme that is not based on the filter or the filter bank comprises OFDM, Single Carrier Frequency Division Multiple Access (SC-FDMA), or CDMA.

In accordance with another aspect of the present disclosure, the method further includes dynamically selecting a data transfer mode according to a local data type, wherein the local data type comprises a data amount within the cache, a delay requirement of the data transmission, a reliability requirement of the data transmission, and a data transmission power requirement.

In accordance with another aspect of the present disclosure, the dynamically selecting of the data transfer mode according to the local data type comprises if the data to be sent in the cache is a small amount of data and/or sporadic small paroxysmal packets, employing the method, otherwise, performing random access and performing scheduling data transmission under a connected state after a connection is established.

In accordance with another aspect of the present disclosure, the method further includes obtaining a grouping and mapping relationship between the random access preamble and the payload data resources, wherein the grouping and mapping relationship comprises respectively grouping the random access preamble and the payload data resources into a normal set and one or more particular set, wherein the particular set of each random access preamble corresponds to a particular scenario or event and corresponds to a particular set of the payload data resources applied to the particular scenario or event.

In accordance with another aspect of the present disclosure, a terminal is provided. The terminal includes a configuration module, a transmission module, and a feedback receiving module, wherein the configuration module is configured to obtain configuration information, wherein the configuration information indicates transmission resources of a random access preamble and payload data, the transmission module is configured to transmit the random access preamble and the payload data at the transmission resources, wherein the payload data is modulated using a modulation scheme supporting asynchronous transmission, and the feedback receiving module is configured to receive feedback information, wherein the feedback information comprises an indication which indicates whether the payload data is successfully received.

In accordance with another aspect of the present disclosure, a method for receiving data with space multiplexing is provided. The method includes transmitting configuration information, detecting a random access preamble at a random access preamble resource position according to the configuration information, when the random access preamble is detected, detecting payload data at transmission resources of the payload data based on a multi-antenna reception technique and using the random access preamble or the random access preamble and a demodulation reference signal at the transmission resources of the payload data, wherein there is a predefined mapping relationship between the random access preamble and the payload data resources, when the payload data is decoded, returning acknowledgment information acknowledgment (ACK) to a transmitter, and when the payload data is not decoded, returning non-acknowledgment information NACK to the transmitter.

In accordance with another aspect of the present disclosure, the method further includes determining whether two or more random access preambles are mapped to the same payload data resources, when two or more random access preambles are mapped to the same payload data resources, performing channel estimation using orthogonal or quasi-orthogonal demodulation reference signals, and distinguishing payload data corresponding to the two or more random access preambles and transmitted at the same payload data resources in a space multiplexing manner, and performing, by a receiver, a multi-user detection (MU-MIMO) at the payload data resources using multiple antennas.

In accordance with another aspect of the present disclosure, the demodulation reference signals are the random access preambles which are orthogonal or quasi-orthogonal to each other, or the demodulation reference signals are reference signals which are transmitted at the payload data resources and are orthogonal or quasi-orthogonal to each other.

In accordance with another aspect of the present disclosure a base station is provided. The base station includes a configuration module, a detection module, and a feedback module, wherein the configuration module is configured to transmit configuration information, the detection module is configured to detect, according to the configuration information, a random access preamble at a random access preamble resource position, when the random access preamble is successfully detected, detect payload data at corresponding payload data resources based on a multi-antenna reception technique and using the random access preamble or the random access preamble and a demodulation reference signal at the corresponding payload data resources, wherein there is a predefined mapping relationship between the random access preamble and the payload data resources, and the feedback module is configured to return acknowledgment information ACK to a transmitter when the payload data is successfully decoded, and return non-acknowledgment information NACK to the transmitter when the payload data is not successfully decoded.

It can be seen from the above that, according to the data transmission method, the terminal, and the base station described in various examples of the present disclosure, the transmission resources of the random access preamble and the payload data are indicated by the configuration information and the payload data is modulated by the modulation scheme supporting asynchronous transmission. As such, the transmission resources of the payload data can be determined through the random access preamble and the payload data can be transmitted at the transmission resources. Therefore, transmission requirements of long duty cycles and sporadic small data packets of a large number of devices in the Internet of Things in future communication systems can be met, and thus the transmission efficiency of the small data packets can be improved.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
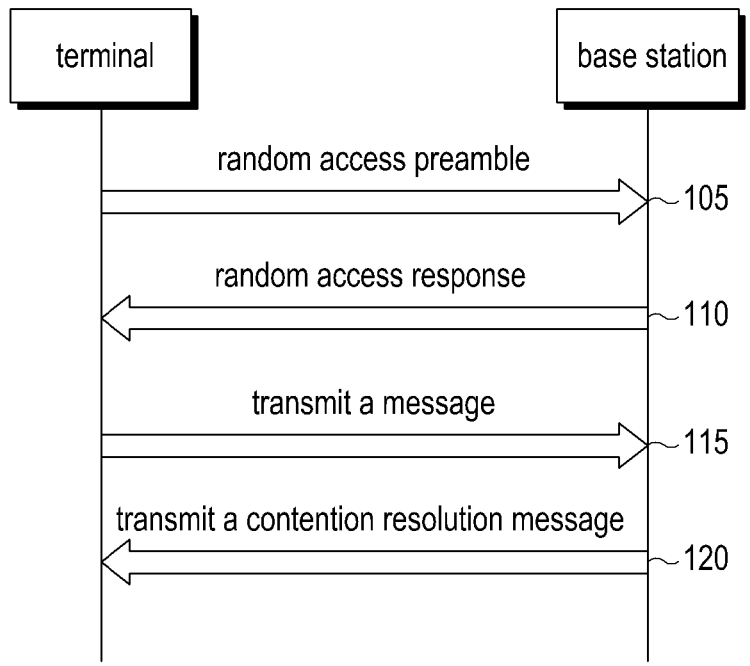
FIG. 1 is a schematic diagram illustrating a long term evolution (LTE) random access procedure according to the related art.
Figure 2:
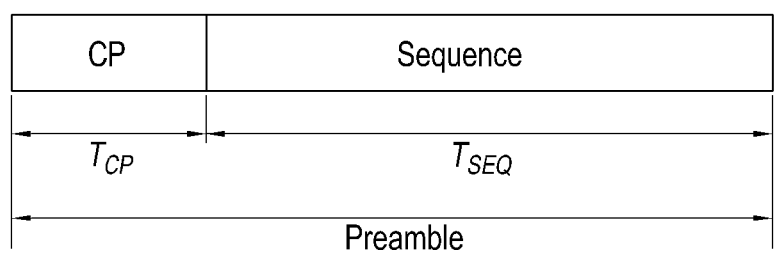
FIG. 2 is a schematic diagram illustrating a structure of a LTE physical random access channel (PRACH) preamble according to the related art.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As may be seen from the above analysis of the prior art, an objective of the random access procedure is to obtain an uplink timing advance value, which is determined by a modulation scheme adopted by the uplink transmission. When a Single Carrier Frequency Division Multiple Access (SC-FDMA) signal is transmitted in the case of no strict time synchronization, SC-FDMA signals of multiple users may cause severe inter-carrier interference and inter-symbol interference, such that reception reliability is greatly reduced. However, when a new modulation scheme (which may also be referred to as a modulation waveform) is used, such as a modulation scheme based on a filter technique or a filter bank technique, e.g., a prototype filter based on an Isotropic Orthogonal Transform Algorithm (IOTA) and an Extended Gaussian Function, a signal waveform with better time-frequency localization may be obtained. When multiple users use such a modulation scheme to implement asynchronous transmission, the inter-carrier interference and inter-symbol interference are much smaller than the impact on the signal reception caused by the noise and the channel. Therefore, such a modulation scheme can effectively support the multi-user asynchronous transmission. Based on methods adopting the filter, the techniques may include filter bank multiple carrier (FBMC), orthogonal frequency division multiplexing-Offset quadrature amplitude modulation (OFDM-OQAM), filtered orthogonal frequency domain multiplexing (Filter-OFDM), generalized frequency domain multiplexing (GFDM), and the like. Various examples of the present disclosure describe a new data transmission method in an unconnected state based on such a filter technique or a filter bank technique. The new data transmission method enables the terminal to transmit small data packets with a lower latency and higher spectral efficiency.

As an improvement of the OFDM of the related art, the multi-carrier technology based on the filter bank is closely followed. The OFDM-OQAM technology is briefly described as follows. A transmission signal may be represented by the following Equation 1:

$$s(t) = \sum_n \sum_{m=0}^{M-1} a_{m,n} \underbrace{i^{m+n} e^{2i\pi m v_0 t} g(t - n\tau_0)}_{g_{m,n}(t)}$$ Equation 1 where $a_{m,n}$ is a value of a real number signal transmitted on the m-th sub-carrier of the n-th symbol, which is a pulse amplitude modulated symbol (PAM). $a_{m,n}$ is a value of a real part or an imaginary part of an Offset Complex QAM symbol. i is an imaginary mark. M is the number of sub-carriers. $v_0$ is a sub-carrier interval. $\tau_0$ is a symbol period of OFDM-OQAM. g is a prototype filter function. $g_{m,n}(t)$ is a prototype filter function modulating $a_{m,n}$. $g_{m,n}(t)$ represents $i^{m+n} e^{2i\pi m v_0 t} g(t-n\tau_0)$. The filter bank modulation based on the g function may make a waveform of OFDM-OQAM be accurately localized in the time domain, so that even in the absence of the cyclic prefix (CP), inter-symbol interference (ISI) may be suppressed in the case of multi-paths. In addition, good localization in the frequency domain may be obtained through the prototype filter function g, so that inter-carrier interference (ICI) caused by Doppler and phase noises may be suppressed.

Figure 3:
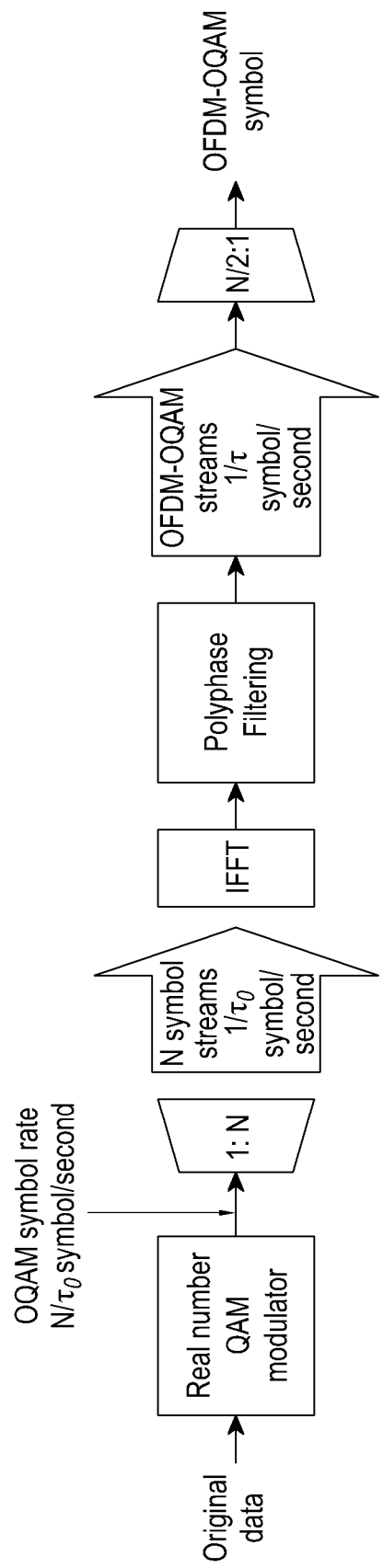
FIG. 3 is a flowchart illustrating a process for generating an orthogonal frequency division multiplexing-Offset quadrature amplitude modulation (OFDM-OQAM) signal according to an embodiment of the present disclosure.

FIG. 3 is a flowchart illustrating a process for generating an OFDM-OQAM signal according to an embodiment of the present disclosure. Obviously, adjustment of the prototype filter function g is critical to the performance.

Referring to FIG. 3, to improve transmission efficiency of long duty cycles and sporadic small data packets (Sporadic Access) of a large number of devices in the Internet of Things in future communication systems, various examples of the present disclosure describe a method of random access and small data amount transmission based on filter-based modulation or filter bank-based modulation.

Figure 4:
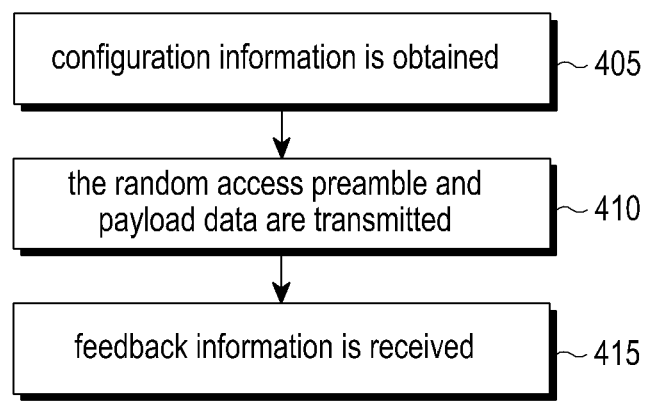
FIG. 4 is a flowchart illustrating a method for transmitting a small packet of data according to an embodiment of the present disclosure.

FIG. 4 is a flowchart illustrating a method for transmitting a small packet of data according to an embodiment of the present disclosure.

Referring to FIG. 4, the method may include the following operations.

At operation 405, configuration information is obtained, in which the configuration information indicates communication resources used for transmitting a small data packet.

The communication resources include transmission resources used for transmitting a random access preamble and payload data.

The configuration information may also indicate information including a position of the resources transmitting the random access preamble and a mapping relationship between the random access preamble and the payload data block resources. The mapping relationship may indicate at least one of a position and size of the payload data block resources corresponding to the random access preamble, a modulation and coding scheme (MCS) of the payload data block corresponding to the random access preamble, a filter parameter or a filter bank parameter of the payload data block corresponding to the random access preamble, and a demodulation reference signal (RS) of the payload data block corresponding to the random access preamble.

The above mapping relationship may further include that two or more random access preambles correspond to the same payload data block resources. In this case, demodulation reference signals of the payload data blocks corresponding to the random access preambles are orthogonal or quasi-orthogonal to each other. The demodulation reference signal may be the corresponding random access preamble, so that the two or more random access preambles are orthogonal or quasi-orthogonal to each other. The demodulation reference signal may be an orthogonal or quasi-orthogonal reference signal corresponding to the random access preamble and indicated by the mapping relationship. In this case, when the random access preamble and the payload data block are transmitted at the corresponding transmission resources, the orthogonal or quasi-orthogonal reference signal corresponding to the random access preamble and indicated by the mapping relationship may be transmitted at the corresponding payload data block resources.

Based on the above mapping relationship, the network side may further configure a grouping and mapping relationship between the random access preamble and the payload data block resources, and send the grouping and mapping relationship to the terminal. The grouping and mapping relationship may include the following information:
the random access preamble and the payload data block resources respectively are grouped into a normal set and one or more particular set;
the particular set of each random access preamble corresponds to a particular scenario or event, and corresponds to a particular set of the payload data block resources applied to the particular scenario or event.

In this case, the particular scenario or event may include but not be limited to a high-speed scenario, an event triggered by too large pathloss, a scenario of large channel delay, an event triggered by too many data transmission failures, and a large data block event.

On payload data block resources in the particular set of the payload data block resources, the payload data block may be transmitted using a specific modulation scheme and/or a filter parameter, including but not limited to:
using a higher overlapping factor to implement single-carrier modulation or multi-carrier modulation based on the filter or the filter bank;
using a prototype filter coefficient which is more suitable for high Doppler frequency shift;
using multi-carrier modulation based on the filter or the filter bank in which adjacent sub-carriers do not overlap with each other;
using a low-order modulation and coding scheme; and
using low-order multi-user space multiplexing.

At operation 410, the random access preamble and the payload data are transmitted.

The terminal selects appropriate payload transmission parameters (including the resource length and the modulation and coding scheme) based on the data amount to be transmitted, and selects the corresponding random access preamble. When multiple preambles or payload transmission parameters meet requirements, the terminal may randomly select the preamble and the payload transmission parameters, and then sends a corresponding signal. Here, the time for transmitting the random access preamble and the payload data may only refer to the downlink signal reception time, instead of using the timing advance information from the base station side. The payload data adopts filter-based or filter bank-based multi-carrier modulation or single-carrier modulation. Such modulation can reduce interference from adjacent frequency signal in the case of non-strict synchronization and improve demodulation success rate of the payload data. Here, the payload data of a user includes valid data and a user identifier of the user.

In this case, the terminal may modulate the payload data using a modulation scheme supporting asynchronous transmission. The modulation scheme supporting the asynchronous transmission may include a single carrier or multi-carrier modulation scheme based on the filter and a multi-carrier modulation scheme based on the filter bank, which may include any one or any combination of FBMC, OFDM-OQAM, Filter-OFDM, GFDM, and SC-FBMC. The modulation scheme supporting the asynchronous transmission does not require strict uplink synchronization.

If the terminal obtains the grouping and mapping relationship between the random access preamble and the payload data resources, the terminal may select, through a predefined rule, a random access preamble in a corresponding random access preamble set before sending the random access preamble and the payload data. Furthermore, after transmitting the random access preamble at a position of the resources transmitting the random access preamble, the payload data may be transmitted at the corresponding payload data resources based on the grouping and mapping relationship and using a modulation and coding scheme and filter parameters determined by the grouping and mapping relationship. In this case, the predefined rule may include but not be limited to a preset pathloss threshold, a threshold of the number of data transmission failures, a threshold of Doppler frequency shift or moving speed, a threshold of data block size and a power threshold.

At operation 415, feedback information is received to determine whether the payload data is successfully received.

When receiving the feedback information, the feedback information may be detected within a fixed time window. The starting time of the time window is calculated based on the transmission time of the random access preamble or the payload data. If the feedback information is not successfully detected within the time window, it may be determined that the random access preamble and the payload data are not successfully received, and the random access preamble and the payload data are re-transmitted.

Based on the feedback information, the terminal may determine three cases shown as follows:

1) The random access preamble and the payload data of the terminal are successfully received. In this case, the user successfully demodulates the feedback information, and finds acknowledgement (ACK) feedback and the user identifier of the user from the feedback information. At this time, the terminal completes the transmission of a small data packet.
2) The terminal demodulates the feedback information and finds non-acknowledgment (NACK) feedback. In this case, the user is unable to find the user identifier of the user. The terminal may re-send the random access preamble and the payload data after a certain period of time. Alternatively, the terminal may enter a backoff transmission mode according to control information.

In the backoff transmission mode, the user may use a modulation scheme that is not based on the filter or the filter bank to transmit data according to the control information. In this case, the control information may include a user identifier assigned by the network, uplink transmission resources, timing advance information, and backoff indication information. In this case, the terminal may transmit data according to a conventional random access procedure, such as the LTE random access procedure. In this case, the modulation scheme that is not based on the filter or the filter bank may include but not be limited to any one or any combination of OFDM, SC-FDMA, and CDMA.

In the backoff transmission mode, the terminal may randomly select, from multiple reference signals or random access preamble resources corresponding to the backoff transmission mode, a reference signal or the random access preamble resources as a demodulation reference signal for transmitting.

3) The terminal does not detect the feedback information, and determines that the random access preamble and the payload data are not successfully received. The terminal may re-send the random access preamble and the payload data after a certain period of time.

When the random access preamble and the payload data are re-transmitted, the terminal may re-select the random access preamble according to a predefined rule. The terminal may determine the transmission resources of the corresponding payload data and/or increase the transmission power according to the re-selected random access preamble.

Figure 5:
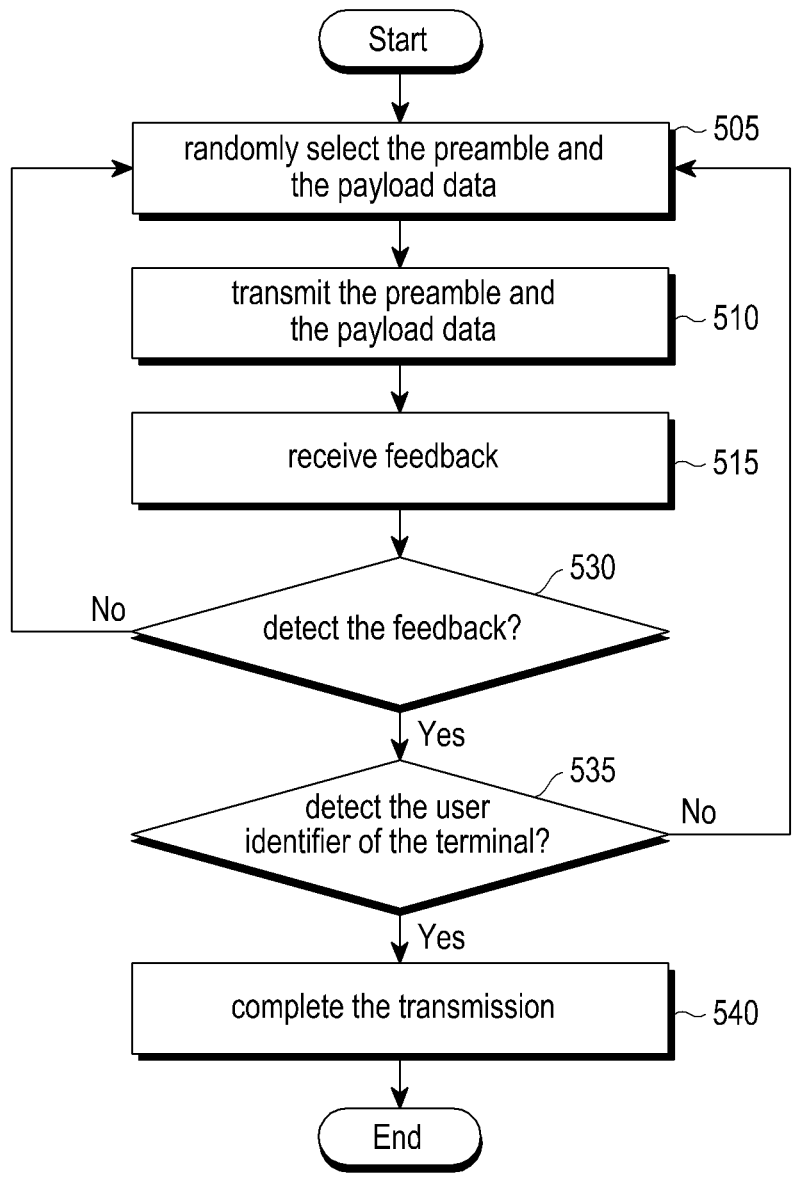
FIG. 5 is a flowchart illustrating a process of transmitting data and receiving feedback by a terminal according to an embodiment of the present disclosure.

FIG. 5 is a flowchart illustrating a process of transmitting data and receiving feedback by the terminal according to an embodiment of the present disclosure.

Referring to FIG. 5, the terminal may randomly select the preamble and the transmission parameters for payload data at operation 505, and transmits the random access preamble and the payload data at operation 510. At operation 515, feedback information is received. Based on the feedback information, the terminal may determine whether the random access preamble and the payload data of the terminal are successfully received at operation 530. At operation 535, the terminal may determine whether ACK feedback and the user identifier of the terminal are detected from the feedback information. At operation 540, the terminal completes the transmission of the payload data.

A First Example

To facilitate understanding of the present disclosure, the example of the present disclosure describes the allocation of the preamble sequence and the payload resources in further detail.

Figure 6:
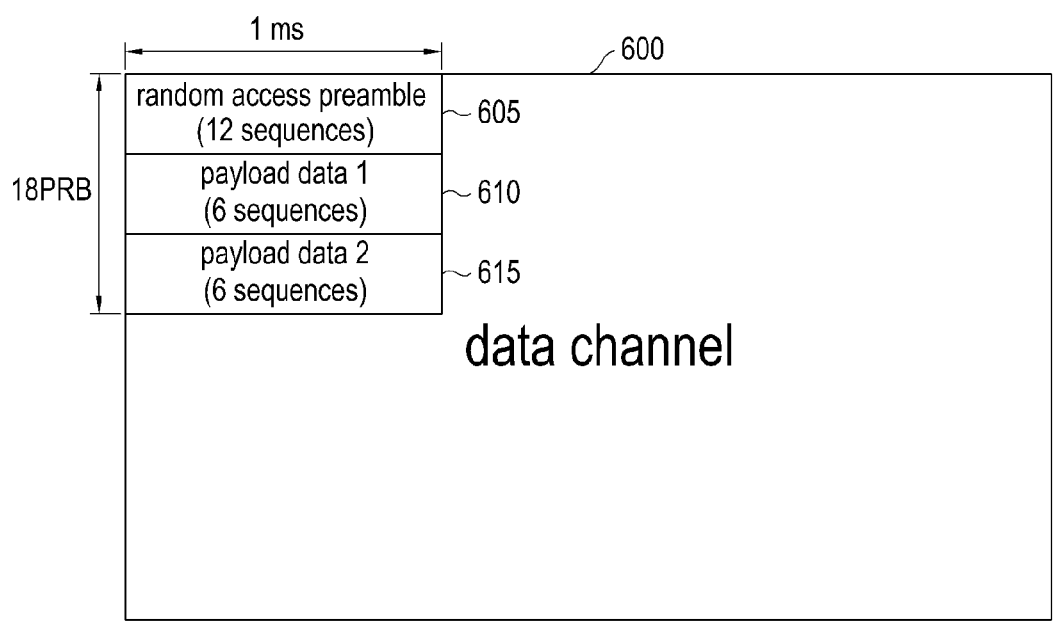
FIG. 6 is a schematic diagram illustrating allocation of a preamble and payload resources according to a first embodiment of the present disclosure.

FIG. 6 is a schematic diagram illustrating the allocation of the preamble and the payload resources, according to a first embodiment of the present disclosure.

Referring to FIG. 6, the reserved preamble resources 605 and the payload resources 610 and 615 are at the same time and different frequencies in the data channel resources 600. The preamble resources 605 occupy 6 PRBs and the payload resources 610 and 615 occupy 12 PRBs. The preamble resources 605 support multiplexing of 12 sequences through orthogonal coding or quasi-orthogonal coding. The payload resources 610 and 615 are divided into two blocks of sub-resource, in which the first preamble sequence to the sixth preamble sequence are mapped to the first payload sub-resource, and the seventh preamble sequence to the twelfth preamble sequence are mapped to the second payload sub-resource. Each sequence corresponds to a modulation and coding scheme. Different sequences may correspond to different modulation and coding schemes.

Table 4 shows an example of such resource allocation, in which r is a channel coding rate. It should be noted that Table 4 provides a simple mapping relationship. Based on the same criteria, the mapping relationship may be extended to multiple mapping relationships between the preamble sequence, and the resource position and the modulation and coding scheme.

TABLE 4

Mapping relationship between the preamble
sequence, and the payload resources and
the modulation and coding scheme

| sequence number | 1~3 | 4~6 | 7~19 | 10~12 |
|---|---|---|---|---|
| resource position | 1 | 1 | 2 | 2 |
| modulation and coding scheme | QPSK, r = ⅓ | QPSK, r = ½ | QPSK, r = ⅓ | QPSK, r = ½ |

Under such resource configuration, the terminal may transmit the preamble and the payload data with the shortest time. However, in the case of limited power, such resource configuration may reduce the reception success rate of the preamble and the payload data.

Figure 7:
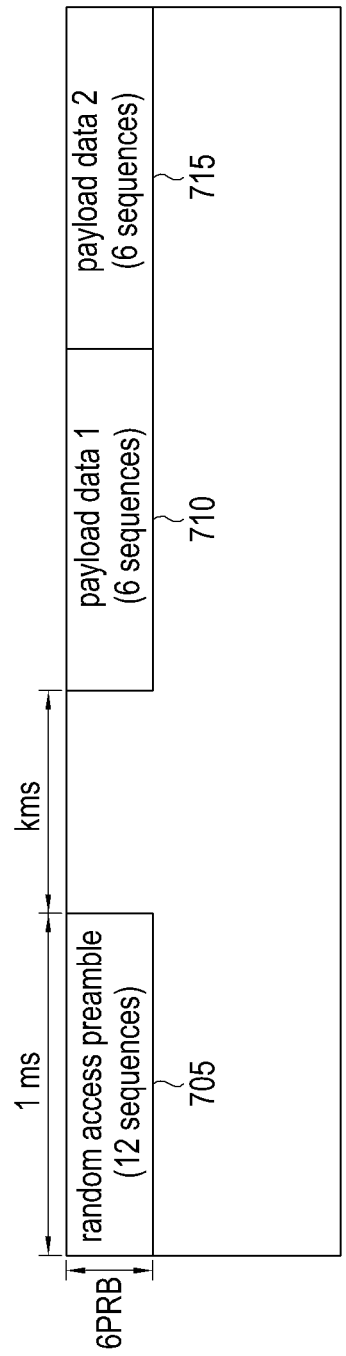
FIG. 7 is a schematic diagram illustrating allocation of a preamble and payload resources according to the first embodiment of the present disclosure.

FIG. 7 is a schematic diagram illustrating allocation of a preamble and payload resources according to the first embodiment of the present disclosure.

Referring to FIG. 7, reserved payload resources 705 and preamble resources 710 and 715 use the same frequency, which is after k (k≥0) millisecond of the preamble resources.

As such, the terminal may not simultaneously transmit the preamble and the payload to ensure each transmission power. Meanwhile, if k (k≥1) is large enough, the base station may arrange scheduling at k after detecting the preamble. When the preamble is not detected, the base station may schedule conventional data transmission on the payload resources. Otherwise, the base station may avoid scheduling conventional data on the payload resources to avoid collision. Such scheduling can reduce the waste of resources caused by the reserved payload resources, and thus improve the efficiency of the spectrum.

When sending the payload data, the modulation schemes based on the filter techniques or the filter bank techniques are used, such as FBMC, GFDM, OFDM-OQAM, Filtered-OFDM, etc. Since the terminal has not obtained the timing advance information, the preamble and the payload data may only refer to the time of receiving the downlink signal. For example, t is the detected reaching time of the downlink signal, the preamble and the payload data are transmitted respectively at t+n and t+n+k, in which n is an integer.

A Second Example

To facilitate understanding of the present disclosure, an example of the present disclosure describes the transmission of the payload data and a feedback manner in detail.

In this case, how the base station detects the payload data and the feedback mechanism of the payload data are described by way of example. When the terminal selects the random access preamble, the terminal may calculate an identifier based on the time-frequency resources where the preamble is located and the index of the selected preamble sequence. In this case, the identifier is called payload-RNTI (PARNTI). For example, PARNTI may be calculated by the following Equation 2:

$$PARNTI = 1 + i_{id} + N \times f_{id} + M \times N \times s_{id} \quad \text{Equation 2}$$

In the formula, $i_{id}$ is the index of the time resource where the preamble is located, $f_{id}$ is the index of the frequency resource where the preamble is located, $s_{id}$ is the index of the preamble sequence, N is the index of the reserved time resources, and M is the index of the reserved frequency resources. The terminal uses PARNTI to scramble the cyclic redundancy check of the payload data, in which the scrambling process is shown as the following Equation 3:

$$c_k = (b_k + x_k) \bmod 2 \text{ for } k=0,1,2,\ldots,L-1 \quad \text{Equation 3}$$

where, $x_k$ is the information bits of PARNTI, $b_k$ is the original cyclic redundancy check bits of the payload data, and $c_k$ is the scrambled cyclic redundancy check bits. The base station performs preamble blind detection on each preamble resource. When the preamble sequence is detected, the base station demodulates, on corresponding payload resources, the payload data according to the corresponding modulation and coding scheme. After the channel is decoded, the base station may perform the cyclic redundancy check using PARNTI generated by the same formula. When the check is successful, the base station determines that the preamble and the payload data of the user are successfully received. When the check fails, the base station may determine that only the preamble sequence is received. It may be seen from the first example that multiple preamble sequences may point to the same payload resources. As such, when multiple users use different preamble sequences, collision of payload data of the users may occur, which leads to failed demodulation of the payload data or payload data of only one user is successfully demodulated. At this time, based on PARNTI, the base station may accurately determine the preamble sequence of which the payload data is successfully demodulated.

The base station sends feedback information according to the demodulation of the detected preamble sequence and payload data. The feedback information may be sent through a control channel, e.g., the LTE Physical Downlink Control Channel (PDCCH). In this case, the base station may use PARNTI to scramble the cyclic redundancy check of the PDCCH. The scrambling process is shown as the following Equation 4:

$$c_k = (b_k + x_k) \bmod 2 \text{ for } k=0,1,2,\ldots,L-1 \quad \text{Equation 4}$$

where, $x_k$ is the information bits of PARNTI, $b_k$ is the original cyclic redundancy check bits of the PDCCH, and $c_k$ is the scrambled cyclic redundancy check bits. Meanwhile, when the detection of the payload data is successful, the PDCCH carries ACK bits and the user identifier detected from the payload data. Otherwise, the PDCCH carries NACK information. Each terminal performs the cyclic redundancy check to the detected PDCCH based on a local-calculated PARNTI. When the check is successful, the terminal reads the ACK/NACK information. When the ACK information is detected, the terminal continues to detect the user identifier. When the user identifier is consistent with a user identifier of the terminal, the terminal determines that the payload data is successfully received. When the user identifier is not consistent with the user identifier of the terminal, the terminal determines that the receiving of the payload data is failed and another user may use the same preamble sequence. When the NACK information is detected, the terminal determines that the base station only detects the preamble but the demodulation of the payload data is failed.

Another method according to an embodiment of the present disclosure is to send the feedback information through a data channel. In this case, the PDCCH indicates the data channel, e.g., the LTE PDSCH is used to send the feedback information. PDSCH data may carry feedback information of multiple users. In this case, a cyclic redundancy check mask used by the PDCCH is no longer the PARNTI, but is a scrambling code calculated based on the preamble resources.

For example, RNTI is calculated using the following Equation 5, in which RNTI is used as the scrambling code:

$$RNTI = 1 + i_{id} + N \times f_{id} \quad \text{Equation 5}$$

Therefore, users sending preambles on the same preamble resources may detect the PDCCH, although the users may use different preamble sequences. Further, when payload data of a user is successfully demodulated, the PDSCH may include an identifier of the user and the ACK information. When demodulation of the payload data of the user is failed, the PDSCH may include the number of the preamble sequence and the NACK information.

Figure 8:
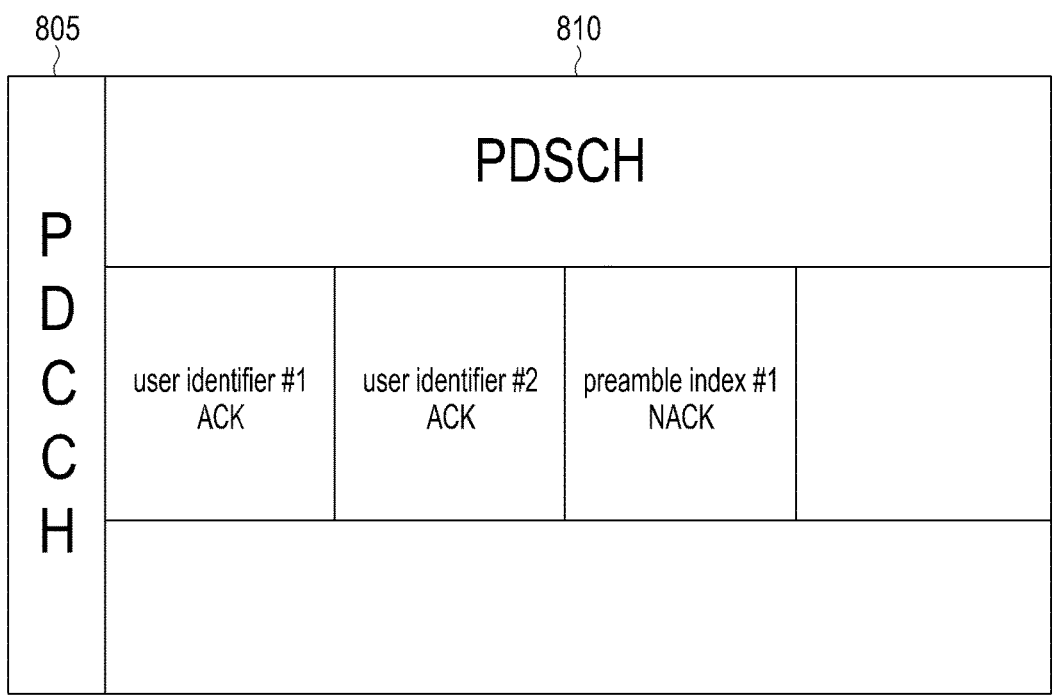
FIG. 8 is a schematic diagram illustrating a process of sending a high volume of feedback through a data channel according to an embodiment of the present disclosure.

FIG. 8 is a schematic diagram illustrating a process of sending a high volume of feedback information via the PDSCH according to an embodiment of the present disclosure.

Referring to FIG. 8, the PDCCH 805 carries information indicating the PDSCH 810. The PDSCH 810 may carry user identifiers and the corresponding ACKs, and a preamble index and the corresponding NACK.

A Third Example

To facilitate understanding of the present disclosure, the example describes a backoff transmission mode in further detail.

In various examples of the present disclosure, the transmission of a small data amount of the terminal may be entirely dependent on the method as described in FIG. 4. The backoff transmission is taken as an enhancement mode in the present disclosure.

In some cases, the terminal may not complete required data transmission through one payload transmission, e.g., there is unsent data in the buffer, the data returned by NACK is received, or no feedback information data is detected. According to an example of the present disclosure, the terminal may re-transmit the random access preamble and the payload data until the data transmission is completed. According to another example of the present disclosure, the backoff transmission may be used. When the backoff transmission is used, the base station transmits control information.

The control information includes necessary information like timing advance, a user identifier assigned by the network, and transmission resources. After backoff control information is received, the terminal may no longer use the filter-based or filter bank-based single-carrier modulation or multi-carrier modulation. For example, the terminal may use SC-FDMA modulation used in the LTE uplink to implement subsequent data transmission. Since at this time the terminal has already obtained the timing advance information, the backoff transmission becomes strictly-synchronized uplink transmission, so that the inter-carrier interference is avoided. For example, when the terminal adds a buffer state indicator in the payload information, the base station may send ACK and uplink scheduling resources in the feedback information. The terminal may complete transmission of remaining data on the subsequent scheduling resources.

Figure 9:
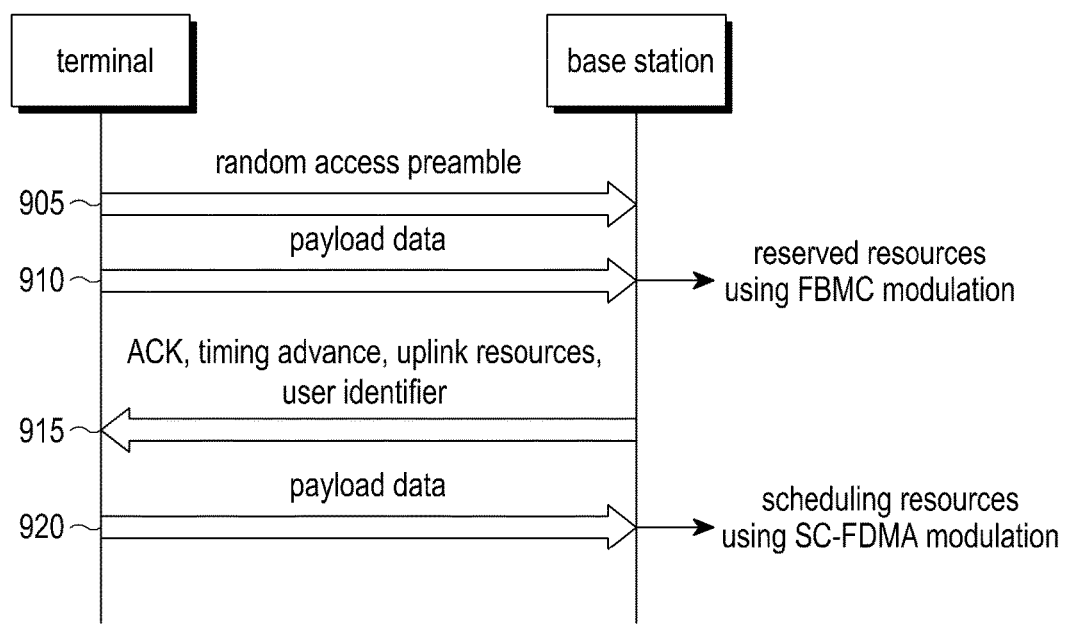
FIG. 9 is a schematic diagram illustrating a process of transmitting data in a buffer using backoff transmission according to an embodiment of the present disclosure.

FIG. 9 is a schematic diagram illustrating a process of transmitting data in a buffer using backoff transmission according to an embodiment of the present disclosure.

Referring to FIG. 9, the terminal transmits a randomly-selected preamble (that is a random access preamble) at operation 905 and transmits payload data at operation 910. The payload data in operation 910 may be transmitted on reserved resources using FBMC modulation. At operation 915, the terminal may receive feedback information including an ACK, a timing advance, uplink resources, and a user identifier of the terminal. At operation 920, the terminal may transmit remaining payload data using the uplink resources.

The payload data in operation 990 may be transmitted on scheduling resources using SC-FDMA modulation.

In another example, the base station may send NACK and the identifier assigned by the network in the feedback information. When the terminal detects that the receiving of the payload data is failed, the terminal may send a message and receive a message in accordance with the LTE random access procedure, and complete the data transmission.

A Fourth Example

To facilitate understanding of the present disclosure, transmission of the payload data with space division multiplexing is described in detail with reference to the present example.

Figure 10:
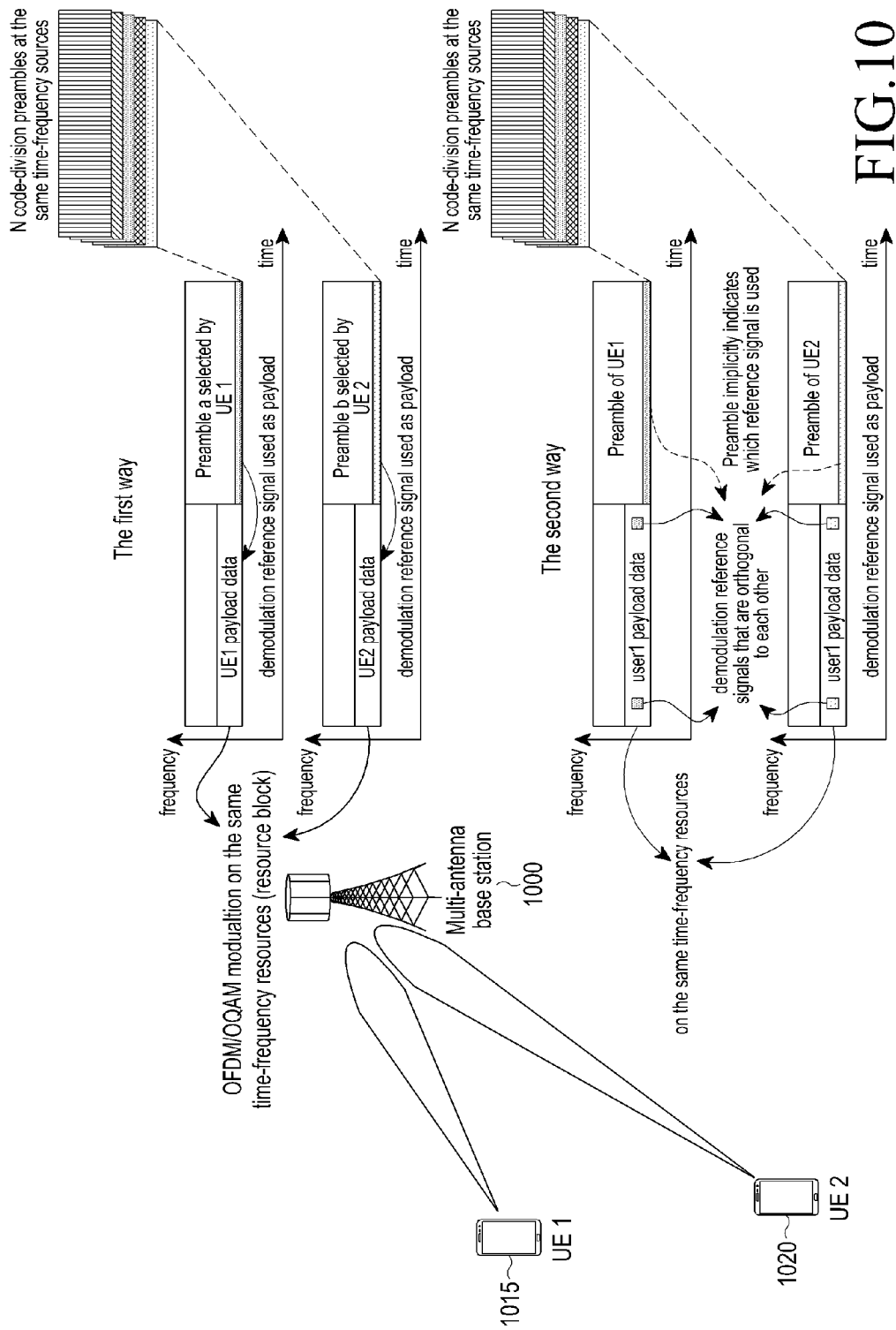
FIG. 10 illustrates a system in which a base station (BS) is configured with multiple antennas so as to support multi-antenna reception according to an embodiment of the present disclosure.

FIG. 10 illustrates a system in which a base station (BS) is configured with multiple antennas so as to support multi-antenna reception according to an embodiment of the present disclosure.

Referring to FIG. 10, N random access preambles of a cell of the base station 1000 used for transmitting paroxysmal small data packets are a signature sequence and multiplexed on the same time-frequency resources. The N random access preambles are distinguished by a signature sequence code. For example, the PRACH preamble in the LTE system uses the Zadoff-chu sequence, the transmission of the payload data uses OFDM-OQAM modulation and is performed following the transmission of the random access preamble. Assuming that to reduce resources reserved for the payload data or limited cell resources, a plurality of random access preambles in the N random access preambles of the cell may be mapped to the same payload data resources.

As shown in FIG. 10, preambles a and b are mapped in the same resource block. Hereinafter, the data transmission and detection process is described in further detail.

At procedure 1, each end user (that is User Equipment (UE) or terminal) obtains configuration information and configuration information of a random access preamble of the cell, including a position of resources for transmitting the random access preamble, initial configuration information of the random access preamble (e.g., a preamble format, a preamble sequence generation parameter, a target reception power in LTE, etc.), and a set of preamble codes for transmitting paroxysmal small data (if the preamble codes are extracted from a preamble resource pool of the cell). The each terminal that is each UE obtains a mapping relationship between the random access preamble and the resources transmitting the corresponding payload data. The mapping relationship determines the following information including a position (including the time domain and/or the frequency domain) and the size of the resources corresponding to the random access preamble and used for transmitting the payload data, a modulation and coding scheme (MCS) used by the payload data corresponding to the random access preamble, a filter parameter or a filter bank parameter used by the payload data corresponding to the random access preamble, a demodulation RS of the payload data corresponding to the random access preamble. The configuration information may be obtained through a system broadcast message.

At procedure 2, when paroxysmal small data packets are transmitted by UE1 1015 and UE2 1020 and no other service requirement requires to establish a synchronous connection with the system, the two UEs 1015 and 1020 respectively select a random access preamble from the N random access preambles as shown in the figure based on the predefined rule. The most simplified predefined rule is to randomly select a random access preamble. Assuming UE1 1015 randomly selects the preamble a and UE2 1020 randomly selects the preamble b, as shown in FIG. 10, both the preamble a and the preamble b are mapped to the resource block X.

At procedure 3, based on the obtained mapping relationship between the random access preamble and the resources transmitting the corresponding payload data, UE1 1015 and UE2 1020 learn that payload data packets are to be transmitted at the resource block X and are informed of corresponding transmission configuration.

When a first process shown in FIG. 10 is used, the each UE may transmit the payload data modulated by OFDM-OQAM at the resource block X without transmitting the demodulation reference symbol (DRS). Because when OFDM-OQAM modulation is used, the terminal does not require uplink timing advance and the transmission time may be directly determined according to downlink timing.

When a second process shown in FIG. 10 is used, each UE may transmit the payload data at the resource block X and also transmit the demodulation reference symbol determined by the preamble. Demodulation reference symbols determined by UE1 1015 and UE2 1020 according to the preamble a and preamble b are orthogonal or quasi-orthogonal to each other. That two signals are orthogonal to each other indicates that a cross-correlation value of the two signals is 0. That the two signals are quasi-orthogonal to each other indicates that the cross-correlation value of the two signals is small. Orthogonality of the demodulation reference symbols may be implemented by performing frequency division multiplexing (FDM), time division multiplexing (TDM), or code division multiplexing (CDM) at the resource block X. The payload data of the terminal includes a user identifier of the terminal (that is UE ID) and information of data packets to be sent.

At procedure 4, the base station 1000 detects the random access preamble transmitted by the each UE 1015 and 1020 at the resource position of the random access preamble according to the configuration information. When the preambles a and b are detected, the base station 1000 detects a data packet transmitted by the user at the resource block X. According to the mapping relationship, the base station learns that at least two users transmit the payload data at the resource block X. Assuming that the preamble a and the preamble b are respectively selected by UE1 1015 and UE2 1020 and no other user selects these two preambles, it means that there is no conflict between the preamble a and the preamble b.

Corresponding to the first process described above, the base station 1000 may configure the preamble a and the preamble b as the demodulation reference signals and perform multi-user multiple-input-multiple-output (MU-MIMO) detection at the resource block X using the multi-antenna reception technology. When configuring the mapping relationship between the random access preamble and the payload data, the system selects a preamble with the best orthogonality to be mapped to the resource block X (e.g., according to the design of the LTE preamble sequence, a preamble sequence which has a larger cyclic shift interval under a same sequence is selected because of its good orthogonality). Based on the orthogonality of the demodulation reference signals, the base station 1000 may detect payload data of multiple users using multiple antennas, which is the MU-MIMO operation.

Corresponding to the second process described above, as UE1 1015 and UE2 1020 select the different preambles a and b, the UEs may implicitly obtain and transmit the orthogonal demodulation reference signals according to a predefined correspondence relationship between the preamble and the demodulation reference signal. In addition to using the preamble as the demodulation reference signal, the base station 1000 may perform the MU-MIMO detection using the orthogonal demodulation reference signal inserted by the terminal at the resource block X, and thereby payload data packets of multiple users are detected.

At procedure 5, the base station 1000 decodes the payload data and read the user identifier to complete the data reception. The base station 1000 returns acknowledgment information ACK to the corresponding UE. In the example shown in FIG. 10, the base station 1000 has a large probability to successfully detect the data packets of UE1 1015 and UE2 1020, and sends the ACK information of the two UEs 1015 and 1020 through the feedback information.

Obviously, according to this process, the reserved payload data resources can be greatly reduced. Assuming the system has N preambles, usually N payload data resource blocks are reserved.

Figure 11:
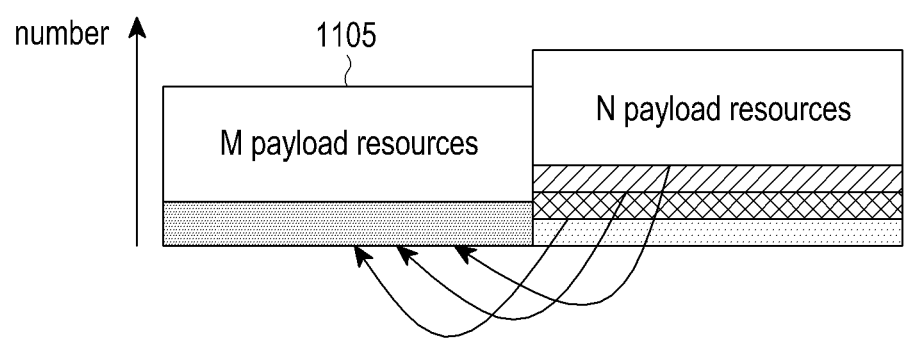
FIG. 11 is a schematic diagram illustrating allocation of a preamble and payload resources according to a fourth embodiment of the present disclosure.

FIG. 11 is a schematic diagram illustrating allocation of a preamble and payload resources according to a fourth embodiment of the present disclosure.

Referring to FIG. 11, when the processes described in various examples of the present disclosure are employed, if parts uses the multi-user MU-MIMO, M payload data resource blocks 1105 are reserved, in which M<N, as shown in FIG. 11. With the increasing of the number of antennas of the base station, higher-order MU-MIMO may be configured, which may further reduce the payload data resources. Of course, this may be considered combining with detection performance requirements.

A Fifth Example

To facilitate understanding of the present disclosure, the grouped mapping between the random access preamble and the payload data resources and selection of a corresponding group are described in further detail with reference to the example.

Figure 12:
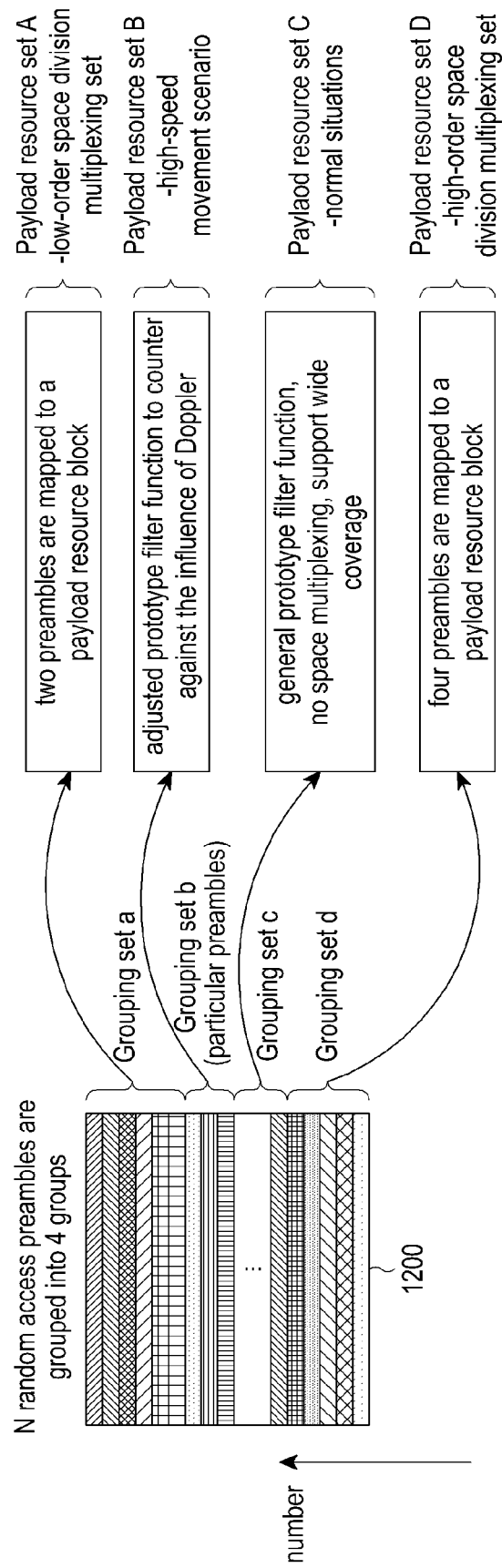
FIG. 12 is a schematic diagram illustrating grouped mapping between a random access preamble and payload data resources according to an embodiment of the present disclosure.

FIG. 12 is a schematic diagram illustrating grouped mapping between a random access preamble and payload data resources according to an embodiment of the present disclosure.

Referring to FIG. 12, N random access preambles 1200 are grouped into four preamble grouping sets {a, b, c, d}. The four sets respectively correspond to four payload resource sets {A, B, C, D} and applied to four different situations.

Referring to FIG. 12, the payload resource set A is a low-order space division multiplexing payload resource set of which a multiplexing order is 2. That is, each two preambles in the preamble grouping set a are mapped to a payload resource block in the payload resource set A.

The payload resource set B is a payload resource set applied to a high-speed moving scenario. As the Doppler frequency shift under the situation of high-speed movement has a great influence on the detection, preambles in the preamble grouping set a are distinguishingly processed. For example, a cell in the LTE that is moving at a high speed has a limitation as to the preamble sequence, so as to avoid a high false alarm rate of the preamble detection at a preamble sequence of a mirror zone where the Doppler frequency shift is generated. In addition, when payload resources in the payload resource set B are transmitted, the filter parameters are adjusted to better counter the influence of Doppler.

The payload resource set C is a normal set, which does not have rigorous requirements to the prototype filter and is more suitable for common cases. In addition, as no space division multiplexing, the coverage can be ensured to a maximum extent.

The payload resource set D is a high-order space division multiplexing payload resource set of which a multiplexing order is 4. That is, each four preambles in the preamble grouping set d are mapped to a payload resource block in the payload resource set D.

Based on the resource grouping illustrated in FIG. 12, hereinafter the selection of the preamble set and special transmission processing performed on the corresponding payload resources are described in further detail with reference to FIG. 13.

Figure 13:
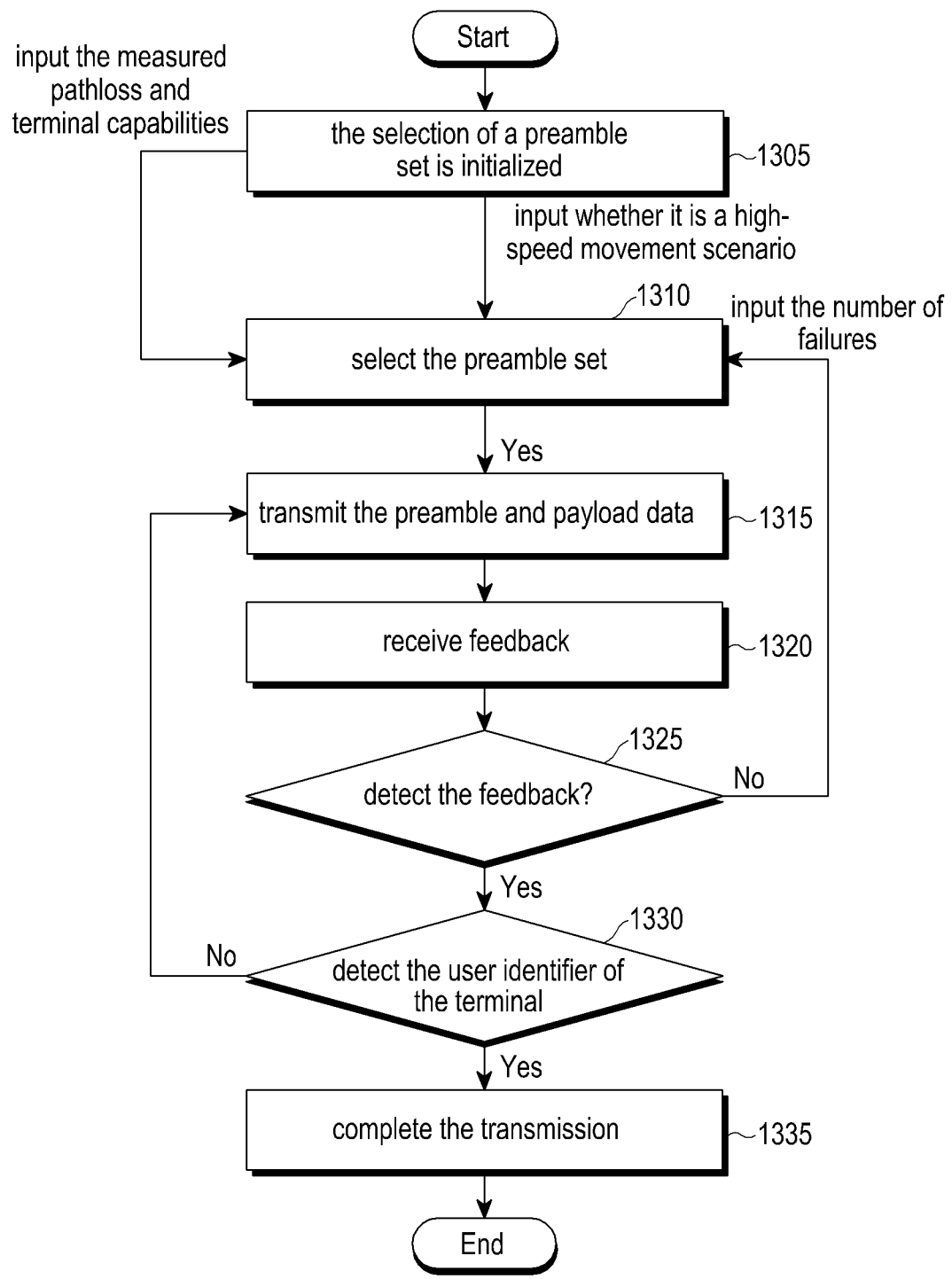
FIG. 13 is a schematic diagram illustrating selection of a preamble grouping set according to an embodiment of the present disclosure.

FIG. 13 is a schematic diagram illustrating selection of a preamble grouping set according to an embodiment of the present disclosure.

Referring to FIG. 13, at operation 1305, the selection of a preamble set of an end user is initialized, which may include the following sub-procedures.

At sub-procedure 1, a configuration message of the system is obtained, so as to obtain the grouped mapping relationship between the random access preamble and the payload data resources. The mapping relationship may indicate whether one or more particular set is included, each particular set corresponds to which particular scenario or particular event, and particular configurations on preambles in the particular set and resource transmission in a corresponding payload data resource particular set applied to the particular scenario or particular event. The adjustment of the particular configurations includes using a prototype filter coefficient which is more suitable for high Doppler frequency shift, using prototype filter functions of different overlapping factors (an overlapping factor is a ratio of the duration of an impact response of the prototype filter function to a modulation symbol period. The overlapping factor determines, at the time domain, how many modulation symbols are overlapped with one modulation symbol. The overlapping factor indicates, at the frequency domain, how many frequency domain coefficients are inserted into a FFT filter coefficient), using the multi-carrier modulation based on the filter or the filter bank in which adjacent sub-carriers do not overlapped with each other, using different modulation and coding schemes, and using multi-user space domain multiplexing with different orders. The particular scenario or the particular event may include but not be limited to a high-speed scenario, an event triggered by too large pathloss, a scenario of larger channel delay, an event triggered by excessive data transmission failures, a large data block event, etc.

At sub-procedure 2, the pathloss is measured, which is used for estimating a power margin at the initial transmission.

At sub-procedure 3, it is determined whether it is the high-speed movement or not.

At operation 1310, the end user determines the selection of the preamble set in accordance with a rule predefined by the system. Determination criteria may include but not be limited to pathloss, whether it is the high-speed movement or not, the number of failed transmissions, terminal capabilities, and so on. An example of the determination may be described as follows with reference of the grouped mapping situation illustrated in FIG. 12. In the example, under the grouped mapping situation, the system pre-defines two pathloss thresholds S1 and S2 (S2>S1) and a high-speed Flag. As such, the rule pre-defined by the system for selecting the preamble set may be described as follows.

Firstly, when the pathloss PL<=S1 and non-high-speed movement (Flag=false), it means that the terminal is very close to the base station. As such, it may be expected that a signal to noise ratio received by the base station is higher. The terminal may preferably select the preamble set d and thus resources in the payload resource set D are used.

Secondly, when the pathloss S2>=PL>S1 and non-high-speed movement (Flag=false), the terminal may preferably select the preamble set a. Although the terminal is not very close to the base station, two-order MIMO multiplexing may still be expected, and resources in the payload resource set A are used.

Thirdly, when high-speed movement (Flag=True), such as a moving speed>120 Km/h, the preamble set b are selected and resources in the payload resource set B are used, thereby the influence of Doppler is reduced and the performance is improved.

Fourthly, when the pathloss PL>S2, the preamble set c is selected and resources in the payload resource set C are used.

The grouping schematic and predefined rule described above with reference to FIG. 12 is one of a plurality of ways. As long as the rule is configured, the terminal may select an appropriate preamble to identify a corresponding scenario or event. The base station may detect the payload data at the particular payload resources using a particular mode. The predefined rule may include but not be limited to a preset pathloss threshold, a threshold of the number of data transmission failures, a threshold of Doppler frequency shift or moving speed, a data block size threshold and a power threshold.

At operation 1315, the end user randomly selects a preamble from the selected preamble set according to a predefined random selection rule and transmit the payload data at corresponding payload resources. The payload data includes an identifier of the end user (UE ID).

At operation 1320, the end user receives feedback information corresponding to the selected preamble within a window period. If the feedback information is not detected when the time window is ended at operation 1325, the terminal determines that the preamble and the payload are not successfully transmitted. After boosting the power, if the number of failures reaches a threshold, e.g., three times, the terminal inputs a failed event to a preamble set determination unit so as to adjust the selection of the set and re-transmit the preamble and the payload.

If the end user detects the feedback information within the window period at operation 1325, and the end user determines that the feedback information does not include the UE ID of the terminal at operation 1330, the terminal determines that the preamble is successfully detected by the base station but the payload data is not successfully transmitted for some reason, e.g., selecting the same preamble with other users so that a conflict is caused. In this case, the terminal may use the backoff mechanism described in the third example. When the UE ID is detected form the feedback information, the terminal completes the transmission at operation 1335.

Obviously, the grouped mapping performed to the access preamble and the payload data can provide a great degree of freedom and can be applied to different situations.

A Sixth Example

To facilitate understanding of the present disclosure, the present example describes when a conventional mode in the system in which a connection is established first and then data transmission is performed and a mode described in various examples of the present disclosure in which the data transmission is performed without establishing the connection are coexistent, how to select and how the two modes coexist. For convenience of description, the former is referred to as mode-C and mode-D.

The mode-C and mode-D may share a random access preamble resource pool (i.e., preamble codes at the same time-frequency resources). As such, all available random access preambles may be divided into two parts, which are respectively represented as mode-C and mode-D. Of course, a more direct mode is that the mode-C and mode-D do not share the random access preamble resource pool. Furthermore, payload data resources of the mode-D are separately reserved and may coexist with other modulation schemes, such as OFDM, SC-FDMA and the like, through simple frequency division or time division.

The terminal may learn, through a system broadcast message, that the mode-C and mode-D coexist and also obtain configuration information of each of them. The terminal has a capability to select one mode from these two modes. Different application scenarios are simply defined for the mode-C and mode-D, the terminal may dynamically select a data transfer mode according to a local data type. The local data type may include at least one of a data amount within the cache, a delay requirement of the data transmission, a reliability requirement of the data transmission, and a data transmission power requirement.

If the data to be sent in the cache is a small amount of data and/or sporadic small paroxysmal packets, the mode-D is employed. The transmission of the payload data is indicated by the random access preamble under the non-connected state and the data is transmitted using the single carrier or multi-carrier modulation technique based on the filter or the filter bank, rather than transmitting the data after performing synchronization and RRC connection in the LTE. As such, unnecessary overhead can be avoided. If the data to be sent in the cache is a data type of low latency requirements, for example, important control information in a smart grid is generally composed of a very small amount of data but the data has a rigorous requirement to the latency, the terminal may use mode-D in this case so as to avoid waste of time for the synchronization and establishing the RRC connection with the base station. In other scenarios, such as a smart meter reading terminal, the data transmission of the terminal has a lower reliability requirement, but the terminal is sensitive to energy consumption due to the use of battery-power. Because the smart meter reading terminal requires to periodically break the RRC connection to save energy, the mode-D is more suitable. Moreover, some scenarios may also allow the terminal to dynamically select the mode-C and mode-D. For example, sometimes a smart phone needs to sporadically transmit small data packets due to the requirements of an application to maintain synchronization between the application and the server, while sometimes the smart phone needs to transmit large amounts of data packets due to the requirement of an application such as video playing, and therefore the operating system of the smart phone may dynamically call the mode-C and mode-D based on the data type.

If the data to be sent in the cache is large amount of data, the duration of scheduling is very long, the mode-C may be used. In this case, after the connection is established based on the conventional random access method, the scheduling data transmission under the connection state is more effective.

Figure 14:
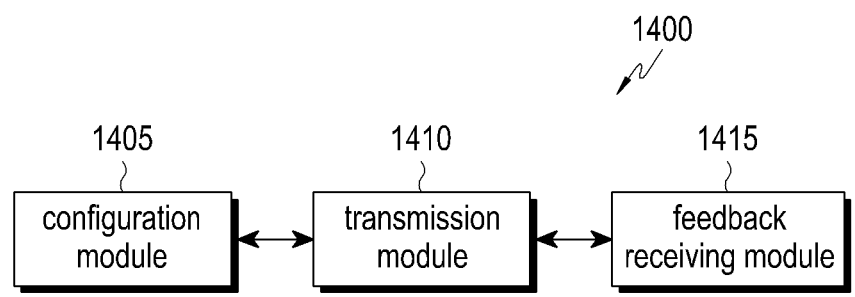
FIG. 14 is a schematic diagram illustrating a structure of a terminal according to an embodiment of the present disclosure.
Figure 15:
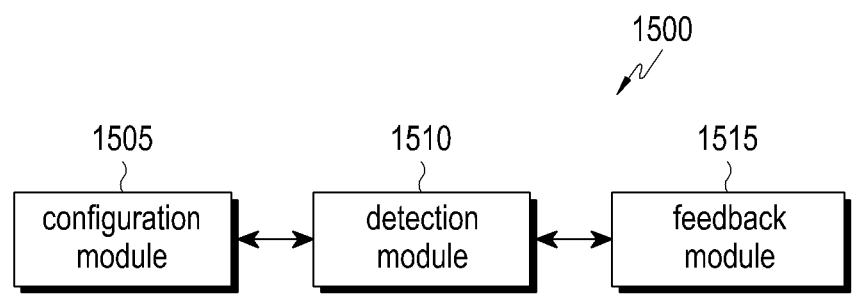
FIG. 15 is a schematic diagram illustrating a structure of a base station according to an embodiment of the present disclosure.

Corresponding to the aforementioned method, various examples of the present disclosure also provide a terminal and a base station of which structures are respectively shown in FIG. 14 and FIG. 15.

FIG. 14 is a schematic diagram illustrating a structure of a terminal according to an embodiment of the present disclosure.

Referring to FIG. 14, the terminal 1400 includes a configuration module (may be implemented as a processor) 1405, a transmission module 1410, and a feedback receiving module 1415.

The configuration module 1405 is configured to obtain configuration information, in which the configuration information indicates transmission resources of a random access preamble and payload data.

The transmission module 1410 is configured to transmit the random access preamble and the payload data at corresponding transmission resources, in which the payload data is modulated by a modulation scheme supporting asynchronous transmission.

The feedback receiving module 1415 is configured to receive feedback information, in which the feedback information at least includes an indication which indicates whether the payload data is successfully received.

FIG. 15 is a schematic diagram illustrating a structure of a base station, according to an embodiment of the present disclosure.

Referring to FIG. 15, the base station 1500 includes a configuration module (may be implemented as a processor) 1505, a detection module (that is a receiving module) 1510, and a feedback module (that is a transmission module) 1515.

The configuration module 1505 is configured to transmit configuration information.

The detection module 1510 is configured to detect, according to the configuration information, a random access preamble at a random access preamble resource position. When the random access preamble is successfully detected, the detection module 1510 is configured to detect payload data at corresponding payload data resources based on a multi-antenna reception technique and using the random access preamble, or the random access preamble and a demodulation reference signal at the corresponding payload data resources. In this case, there is a predefined mapping relationship between the random access preamble and the payload data resources.

The feedback module 1515 is configured to return acknowledgment information ACK to a corresponding transmitter when the payload data is successfully decoded, and return non-acknowledgment information NACK to the corresponding transmitter when the payload data is not successfully decoded.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A data transmission method, the method comprising:
   obtaining, by a terminal, configuration information, wherein the configuration information indicates transmission resources of a random access preamble and payload data corresponding to the random access preamble;
   transmitting, by the terminal, the random access preamble and the payload data at the transmission resources, wherein the transmitting comprises modulating the payload data using a modulation scheme supporting asynchronous transmission; and receiving, by the terminal, feedback information, wherein the feedback information comprises an indication which indicates whether the payload data is successfully received.

2. The method of claim 1, wherein the transmission resources comprise a position of resources transmitting the random access preamble and a mapping relationship between the random access preamble and the payload data resources, and wherein the mapping relationship indicates at least one of: a position and size of the payload data resources corresponding to the random access preamble, a modulation and coding scheme (MCS) of the payload data corresponding to the random access preamble, a filter parameter or a filter bank parameter of the payload data corresponding to the random access preamble, or a demodulation reference signal of the payload data corresponding to the random access preamble.

3. The method of claim 2, wherein the mapping relationship further indicates two or more random access preambles that correspond to the same payload data resources, and wherein demodulation reference signals of payload data corresponding to the random access preambles are orthogonal or quasi-orthogonal to each other.

4. The method of claim 3, wherein the demodulation reference signal is the corresponding random access preamble, so that the two or more random access preambles are orthogonal or quasi-orthogonal to each other.

5. The method of claim 3, wherein the demodulation reference signal is an orthogonal or quasi-orthogonal reference signal corresponding to the random access preamble and indicated by the mapping relationship, and wherein the transmitting of the random access preamble and the payload data at the transmission resources comprises transmitting the orthogonal or quasi-orthogonal reference signal corresponding to the random access preamble and indicated by the mapping relationship at the corresponding payload data resources.

6. The method of claim 3, further comprising:

obtaining a grouping and mapping relationship between the random access preamble and the payload data resources, wherein the grouping and mapping relationship comprises:

respectively grouping the random access preamble and the payload data resources into a normal set and one or more particular set, and wherein the particular set of each random access preamble corresponds to a particular scenario or event and corresponds to a particular set of the payload data resources applied to the particular scenario or event.

7. The method of claim 2, wherein a time of transmitting the payload data is calculated based on a time of transmitting the preamble, and wherein, when the time of transmitting the preamble is N, the time of transmitting the payload data is N+k, wherein k≥0.

8. The method of claim 2, further comprising:

transmitting the payload data using a cyclic redundancy check scrambling code, wherein the cyclic redundancy check scrambling code is calculated based on an index of resources occupied by the random access preamble and the index of the random access preamble.

9. The method of claim 2, further comprising:

obtaining a grouping and mapping relationship between the random access preamble and the payload data resources, wherein the grouping and mapping relationship comprises respectively grouping the random access preamble and the payload data resources into a normal set and one or more particular set, and wherein the particular set of each random access preamble corresponds to a particular scenario or event and corresponds to a particular set of the payload data resources applied to the particular scenario or event.

10. The method of claim 9, wherein the particular scenario or event comprises at least one of: a high-speed scenario, an event triggered by a too large pathloss, a scenario of large channel delay, an event triggered by too many data transmission failures, or a large data block event.

11. The method of claim 9, further comprising:

transmitting the payload data at payload data resources in the particular set of the payload data resources using a specific modulation scheme and/or a filter parameter comprising:

using a higher overlapping factor to implement single-carrier modulation or multi-carrier modulation based on the filter or the filter bank;

using a prototype filter coefficient which is more suitable for high Doppler frequency shift;

using multi-carrier modulation based on the filter or the filter bank in which adjacent sub-carriers do not overlap with each other;

using a low-order modulation and coding scheme; and using low-order multi-user space multiplexing.

12. The method of claim 11, wherein, before the operation of transmitting the random access preamble and the payload data at the transmission resources, the method further comprises:

selecting, through a predefined rule, a random access preamble in a corresponding random access preamble set according to the obtained grouping and mapping relationship between the random access preamble and the payload data resources, and wherein the transmitting of the random access preamble and the payload data at the transmission resources comprises:

after the transmitting of the random access preamble at the position of the resources for transmitting the random access preamble, transmitting the payload data at the corresponding payload resources based on the grouping and mapping relationship and using a modulation and coding scheme and filter parameters determined by the grouping and mapping relationship.

13. The method of claim 12, wherein the predefined rule comprises at least one of: a preset pathloss threshold, a threshold of the number of data transmission failures, a threshold of Doppler frequency shift or moving speed, a threshold of data block size, or a power threshold.

14. The method of claim 1, wherein the payload data comprises valid data and a user identifier.

15. The method of claim 14, wherein the payload data further comprises buffer state information.

16. The method of claim 1,
wherein the receiving of the feedback information comprises receiving the feedback information from a control channel or a data channel, and
wherein the feedback information comprises one or more user identifier and is configured to indicate whether payload data of the one or more user is successfully received.

17. The method of claim 16, further comprising:
based on the detected feedback information, re-transmitting the random access preamble and the payload data.

18. The method of claim 17,
wherein the feedback information carries control information, and wherein the control information comprises at least one of: a user identifier assigned by a network, uplink transmission resources, timing advance information, or backoff indication information,
wherein the method further comprising:
performing a backoff transmission mode based on the detected feedback information, and
wherein the backoff transmission mode adopts a modulation scheme that is not based on a filter or a filter bank, and the backoff transmission mode transmits the payload data using uplink transmission resources indicated by the feedback information.

19. The method of claim 18, further comprising:
calculating an uplink transmission time in the backoff transmission mode based on the timing advance information; and
transmitting the payload data or random access procedure related data through the backoff transmission mode.

20. The method of claim 18, wherein the modulation scheme that is not based on the filter or the filter bank comprises OFDM, SC-FDMA, or CDMA.

21. The method of claim 17, further comprising:
when the feedback information is detected and the feedback information does not comprise the identifier of the terminal, randomly re-selecting a random access preamble according to a predefined rule, determining transmission resources of corresponding payload data according to the re-selected random access preamble, transmitting the re-selected random access preamble, and transmitting the payload data at the transmission resources of the payload data,
wherein a transmission power for transmitting the re-selected random access preamble and the payload data is increased or remains unchanged.

22. The method of claim 17,
wherein the re-transmitting of the random access preamble and the payload data comprises:
randomly re-selecting a random access preamble according to a predefined rule;
determining transmission resources of corresponding payload data according to the re-selected random access preamble;
transmitting the re-selected random access preamble; and
transmitting the payload data at the transmission resources of the payload data, and
wherein a transmission power for transmitting the re-selected random access preamble and the payload data is increased or remains unchanged.

23. The method of claim 16, further comprising:
detecting the feedback information using a cyclic redundancy check, wherein a cyclic redundancy check scrambling code is calculated based on resources occupied by the random access preamble or based on the resources occupied by the random access preamble and the index of the random access preamble.

24. The method of claim 16, wherein the receiving of the feedback information comprises:
detecting the feedback information within a fixed time window, wherein a starting time of the time window is calculated based on a time of transmitting the payload data or time of transmitting the random access preamble; and
when the feedback information is not successfully detected within the time window, determining that the random access preamble and the payload data are not successfully received, and re-transmitting the random access preamble and the payload data.

25. The method of claim 1,
wherein the modulation scheme supporting the asynchronous transmission comprises a single-carrier modulation scheme based on a filter, a multi-carrier modulation scheme based on a filter, and a multi-carrier modulation scheme based on a filter bank comprising any one or any combination of Filter bank multiple carrier (FBMC), Orthogonal frequency division multiplexing-Offset quadrature amplitude modulation (OFDM-OQAM), Filtered orthogonal frequency domain multiplexing (Filter-OFDM), Generalized frequency domain multiplexing (GFDM), and SC-FBMC, and
wherein the modulation scheme supporting the asynchronous transmission does not require strict uplink synchronization.

26. The method of claim 1, further comprising:
dynamically selecting a data transfer mode according to a local data type,
wherein the local data type comprises a data amount within a cache, a delay requirement of the data transmission, a reliability requirement of the data transmission, and a data transmission power requirement.

27. The method of claim 26, wherein the dynamically selecting of the data transfer mode according to the local data type comprises:
if the data to be sent in the cache is a small amount of data or sporadic small paroxysmal packets, employing the method; and
if the data to be sent in the cache is not a small amount of data and is not sporadic small paroxysmal packets, performing random access and performing scheduling data transmission under a connected state after a connection is established.

28. A terminal comprising:
at least one processor configured to obtain configuration information, wherein the configuration information indicates transmission resources of a random access preamble and payload data;
a transmitter configured to transmit the random access preamble and the payload data at the transmission resources, wherein the payload data is modulated using a modulation scheme supporting asynchronous transmission; and
a receiver configured to receive feedback information, wherein the feedback information comprises an indication which indicates whether the payload data is successfully received.

29. A method for receiving data with space multiplexing, the method comprising:
- transmitting, by a base station, configuration information;
- detecting, by the base station, a random access preamble at a random access preamble resource position according to the configuration information;
- when the random access preamble is detected, detecting, by the base station, payload data at transmission resources of the payload data based on a multi-antenna reception technique and using the random access preamble or the random access preamble and a demodulation reference signal at the transmission resources of the payload data, wherein there is a predefined mapping relationship between the random access preamble and the payload data resources;
- when the payload data is decoded, returning, by the base station, acknowledgment information ACK to a transmitter; and
- when the payload data is not decoded, returning, by the base station, non-acknowledgment information NACK to the transmitter.

30. The method of claim 29, further comprising:
- determining whether two or more random access preambles are mapped to the same payload data resources;
- when two or more random access preambles are mapped to the same payload data resources, performing, by the base station, channel estimation using orthogonal or quasi-orthogonal demodulation reference signals, and distinguishing payload data corresponding to the two or more random access preambles and transmitted at the same payload data resources in a space multiplexing manner; and
- performing, by a receiver of the base station, a multi-user detection (MU-MIMO) at the payload data resources using multiple antennas.

31. The method of claim 30, wherein the demodulation reference signals are one of: the random access preambles which are orthogonal or quasi-orthogonal to each other, or reference signals which are transmitted at the payload data resources and are orthogonal or quasi-orthogonal to each other.

32. A base station comprising:
- at least one processor; and
- a memory communicatively coupled to the at least one processor,
- wherein the at least one processor configured to:
  - transmit configuration information;
  - detect, according to the configuration information, a random access preamble at a random access preamble resource position, when the random access preamble is successfully detected;
  - detect payload data at corresponding payload data resources based on a multi-antenna reception technique;
  - use the random access preamble or the random access preamble and a demodulation reference signal at the corresponding payload data resources, wherein there is a predefined mapping relationship between the random access preamble and the payload data resources; and
  - return acknowledgment information ACK to a transmitter when the payload data is successfully decoded, and return non-acknowledgment information NACK to the transmitter when the payload data is not successfully decoded.

* * * * *